United States Patent
Pattee et al.

(10) Patent No.: US 7,243,761 B1
(45) Date of Patent: Jul. 17, 2007

(54) RACHET LOCKING BRAKE FOR MEDICAL DEVICES

(75) Inventors: Jeffrey W. Pattee, Salt Lake City, UT (US); John M. Simmons, West Jordan, UT (US); David M. Robbins, Sandy, UT (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 1471 days.

(21) Appl. No.: 09/690,272

(22) Filed: Oct. 17, 2000

(51) Int. Cl.
*B60T 1/14* (2006.01)
(52) U.S. Cl. .................. 188/7; 188/5; 188/32
(58) Field of Classification Search .......... 188/5, 188/7, 2 F, 32, 23, 19, 20; 5/600; 296/20
See application file for complete search history.

(56) References Cited

U.S. PATENT DOCUMENTS

| | | | | |
|---|---|---|---|---|
| 2,236,281 A | * | 3/1941 | Anderson | 188/5 |
| 2,747,692 A | * | 5/1956 | Holmes | 188/5 |
| 2,922,494 A | * | 1/1960 | Clark, Jr. | 188/5 |
| 3,422,929 A | * | 1/1969 | Oja et al. | 188/5 |
| 5,806,111 A | * | 9/1998 | Heimbrock et al. | 5/600 |

FOREIGN PATENT DOCUMENTS

| | | |
|---|---|---|
| JP | 49-009888 A | 1/1974 |
| JP | 63-150070 A | 6/1988 |
| JP | 01-167212 U | 11/1989 |
| JP | 04-331602 A | 11/1992 |
| JP | 05-065315 U | 8/1993 |
| JP | 06-005619 U | 1/1994 |
| JP | 06-048102 A | 2/1994 |
| JP | 09-140692 A | 6/1997 |

OTHER PUBLICATIONS

PCT International Search Report PCT/US03/36255 (Aug. 4, 2004).

* cited by examiner

*Primary Examiner*—Thomas Williams
(74) *Attorney, Agent, or Firm*—McAndrews, Held & Malloy, Ltd.; Peter J. Vogel; Michael A. Dellapenna

(57) ABSTRACT

An apparatus is provided for securely positioning a medical device that prevents movement of one end of the device by applying a single force. The apparatus allows a doctor to depress a pedal, which is connected to a pedal housing by way of a single shaft. Connected to the ends of the shaft are two separate linkage members. The first linkage member is attached to a ratcheting mechanism that steers the pedal into the locked position. The second linkage member is connected to a cam within the pedal housing that drives a spring-loaded plunger assembly. When the pedal is in the locked position the plunger assembly is in contact with the floor, thereby preventing movement of the device. To release the braking device, the doctor depresses the pedal slightly, which causes the ratcheting mechanism to allow the pedal, and therefore the plunger assembly, to return to their unlocked positions.

8 Claims, 5 Drawing Sheets

RACHET LOCKING BRAKE FOR MEDICAL DEVICES

CROSS REFERENCE TO RELATED APPLICATIONS (IF APPLICABLE)

Not applicable.

STATEMENT REGARDING FEDERALLY SPONSORED RESEARCH & DEVELOPMENT (IF APPLICABLE)

Not applicable.

BACKGROUND OF THE INVENTION

The preferred embodiments of the present invention generally relate to an apparatus for securing the positioning of a medical device.

It is desirable that medical personnel have access to mobile medical devices. This is especially true in hospitals, where patients may be transported between emergency rooms, operating rooms, x-ray facilities, patient rooms, and the like. Thus, it is common for medical devices to have wheel assemblies, such as caster wheels, to allow for easy movement of the device in any direction. However, it is also desirable that once the doctor or nurse has placed the device in its proper location that the device remains secure. For example, if a mobile surgical table moved during a surgical procedure, it could cause the doctor to cut or damage vital organs. Likewise, a mobile X-ray unit must remain securely positioned so that the doctor will obtain the precise view that he or she seeks. To provide such stability, prior medical devices included caster wheels with locks on each wheel in order to restrict or hamper movement. Such locks are attached to each wheel assembly, and the user simply twists or pushes the lock to engage it. However, these prior art locking devices suffer from two flaws.

First, when time is of the essence, doctors or nurses do not have the time to engage (or disengage) the lock on each individual wheel, especially when working in tight confines which may make it difficult to even access the lock. Thus, there has been a long felt need for a braking apparatus that secures the positioning of a mobile medical device that can be quickly and easily engaged. Second, the prior art locking devices require that the locked wheel be in contact with the floor. If the medical device is used on an uneven floor or is placed over a drain or similar depression, one or more of the wheels may be slightly above the floor. In such a situation, the wheel that is off the floor cannot prevent the device from shifting, even if the wheel is locked. Thus, there has also been a long felt need for a braking apparatus that can secure a medical device even if the device is positioned on an uneven surface.

A need exists for an improved braking apparatus for medical devices. The preferred embodiments meet this and other needs that will become more apparent from the following description and appended claims and drawings.

BRIEF SUMMARY OF THE INVENTION

An apparatus is provided for securing a medical device that lowers a spring-loaded plunger assembly into contact with the floor, thereby inhibiting movement of the medical device. The doctor engages the plunger assembly by simply depressing a pedal; to raise the plunger assembly, the doctor presses down on the pedal a second time, which releases the locking mechanism and returns both the pedal and the plunger assembly to their original, unlocked position. Thus, the preferred embodiments of the present invention provide a braking apparatus that can easily be engaged (or disengaged) with a single motion.

A preferred embodiment of the present invention includes a pedal housing that attaches to a medical device. In the base of the pedal housing is a recess for locating a spring-loaded plunger assembly. The plunger includes a hollow, cylindrical piston having a brake pad located on one end. When the locking device is engaged, the plunger assembly protrudes through the recess and the brake pad comes into contact with the floor, thereby prohibiting movement of the medical device. When disengaged the plunger assembly retracts, returning to its original position within the pedal housing.

Connected to the pedal housing is a pedal, which when depressed rotates a shaft located within the pedal housing. Each end of the shaft is connected to separate sets of linkage members that run along the outside of the pedal housing. The first set of linkage members is attached to a spring-loaded plunger pin that is steered through a grooved ratcheting mechanism. This diamond shape groove includes numerous steps that restrict the movement of the plunger pin as it travels. When the pedal is depressed, the plunger pin moves around the groove until it reaches the locked position. The pedal remains in the locked position until the doctor depresses the pedal again slightly, which allows the plunger pin to step down in the groove, allowing the plunger pin to continue its movement around the groove and back to its original position. This allows the pedal to return up to the unlocked position.

The second set of linkage members runs along the opposite side of the pedal housing and is attached to a camshaft. As the pedal is depressed, the rotation of the shaft is transmitted to the camshaft, which drives a cam within the housing. The cam pushes a cam follower that is in contact with a spring located within a piston in the plunger assembly. As the cam pushes the cam follower, the spring is forced downward, thereby pushing the plunger assembly into the locked position. When the pedal is returned to the unlocked position, the cam is raised, allowed the plunger assembly to spring back into the pedal housing. Since the plunger assembly is spring loaded, it can adjust for use on uneven floors or floors of varying height.

These and other features of the preferred embodiments of the present invention are discussed in the following detailed description of the preferred embodiments of the present invention. It shall be understood that other features and advantages will become apparent to those skilled in the art upon review of the following detailed description, drawings, and claims.

DETAILED DESCRIPTION OF THE INVENTION

Figure 1:
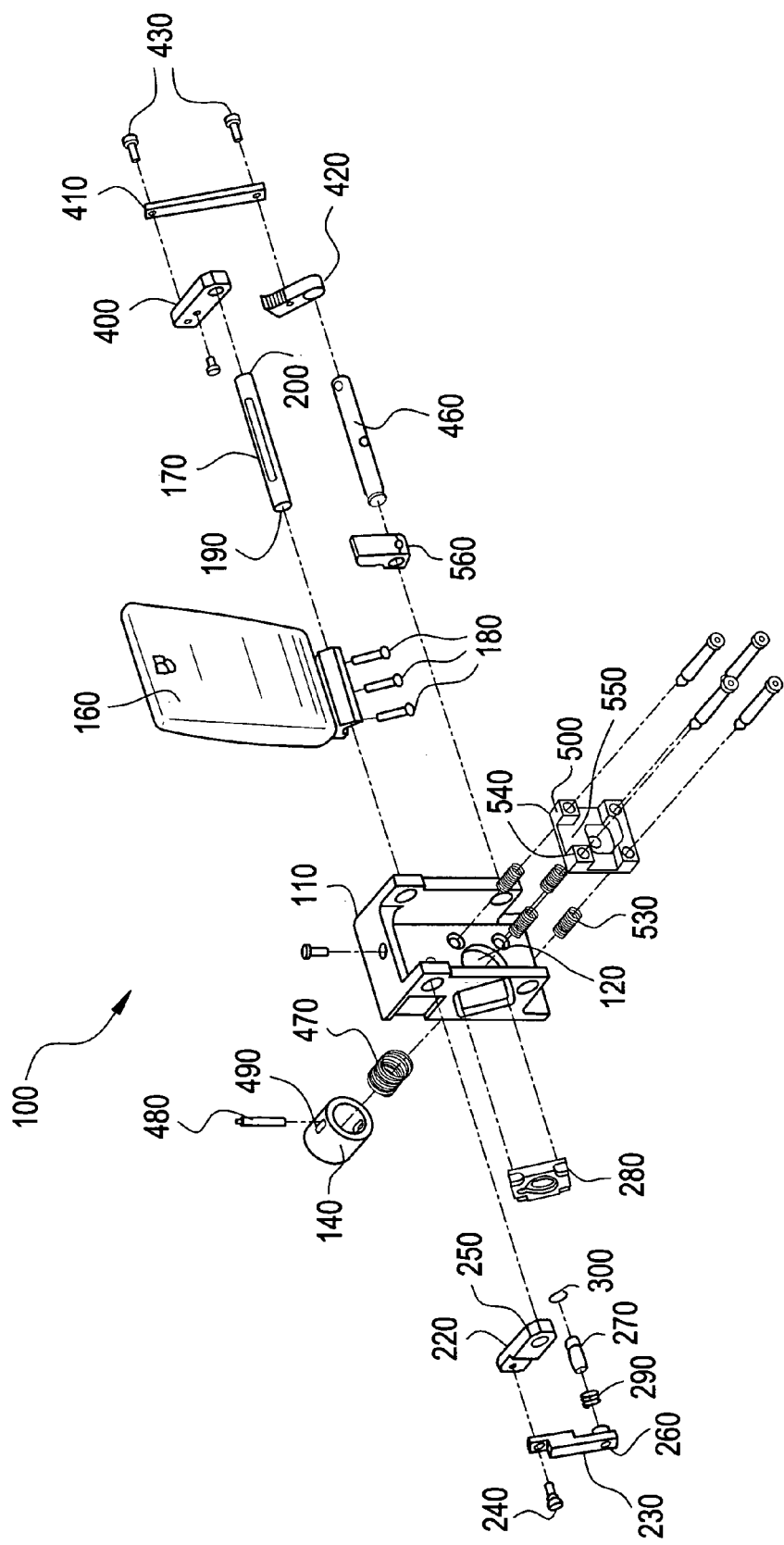
FIG. 1 illustrates the components in accordance with a preferred embodiment of the present invention.
Figure 2:
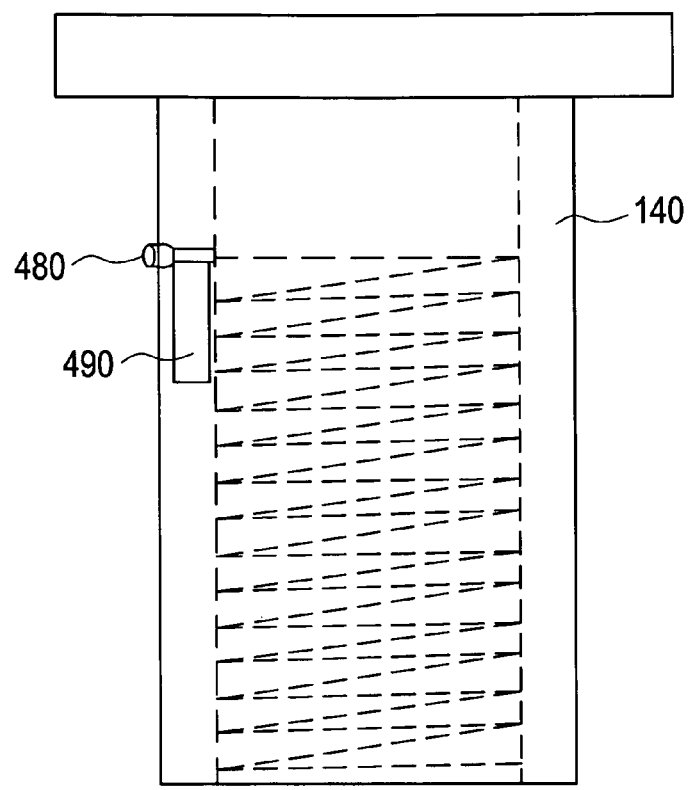
FIG. 2 illustrates a plunger assembly in accordance with a preferred embodiment of the present invention.
Figure 6:
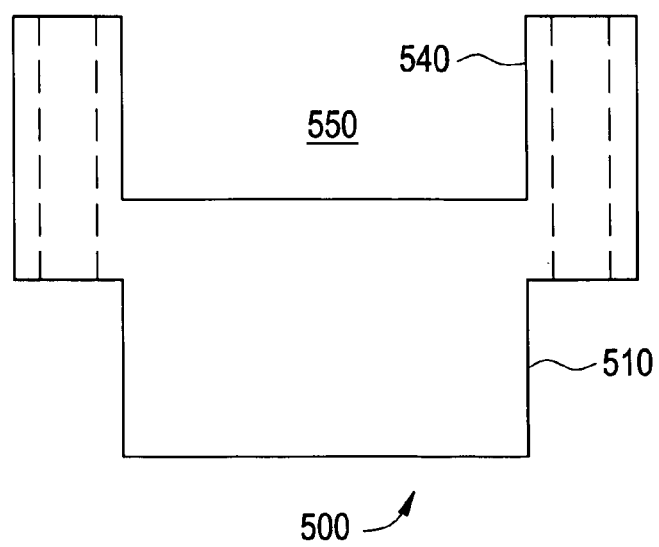
FIG. 6 illustrates a cam follower in accordance with a preferred embodiment of the present invention.

FIG. 1 illustrates a braking apparatus 100 for securely positioning a medical device (not shown). The braking apparatus 100 includes a pedal housing 110 having a recess 120 for locating a plunger assembly 130 (as seen in FIG. 2). In a preferred embodiment of the present invention, the plunger assembly 130 includes a hollow, cylindrical piston 140 having a brake pad 150 located at one end. When the braking apparatus 100 is engaged, the plunger assembly 130, and more particularly the brake pad 150, is in contact with the floor, thereby prohibiting movement of the medical device.

The braking apparatus 100 is engaged by depressing a pedal 160 that is attached to a shaft 170 located within the pedal housing 110. In a preferred embodiment, the shaft 170 includes machined-flattened sides to allow fasteners 180 to be inserted through the shaft 170 and into the pedal 160. Once attached, the vertical force applied to the pedal 160 is transmitted to the shaft 170, causing the shaft 170 to rotate.

Figure 3:
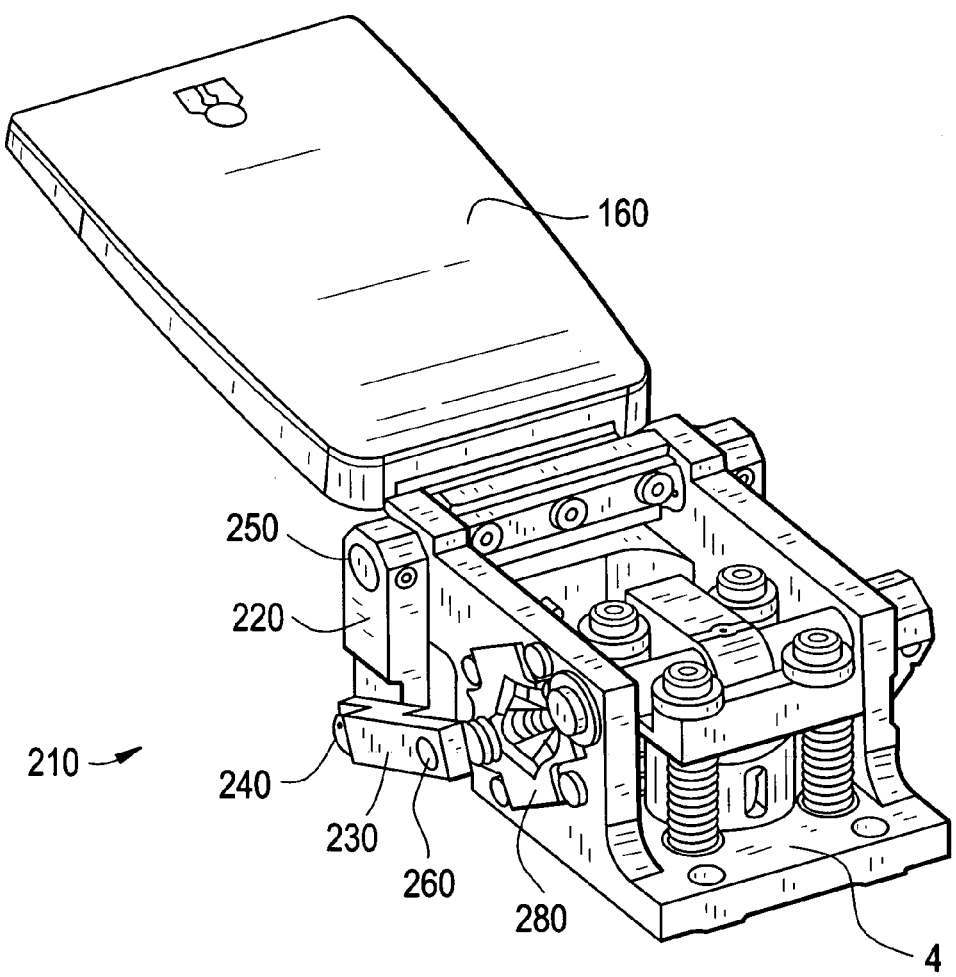
FIG. 3 illustrates a front view of a preferred embodiment of the present invention.

The shaft 170 includes two ends 190 and 200, each of which is connected to a separate set of linking members. As seen in FIG. 3, the first set of linking members 210 steers the pedal 160 into either the locked or unlocked positions. This set includes two links, a front link 220 and a back link 230, which are connected by a pin 240. The front link 220 includes an opening 250 through which the shaft 170 is inserted, while the back link 230 has an opening 260 for locating a plunger pin 270. As the shaft 170 turns, the rotation is transmitted through the front link 220 to the back link 230, causing the plunger pin 270 to move laterally.

Figure 4:
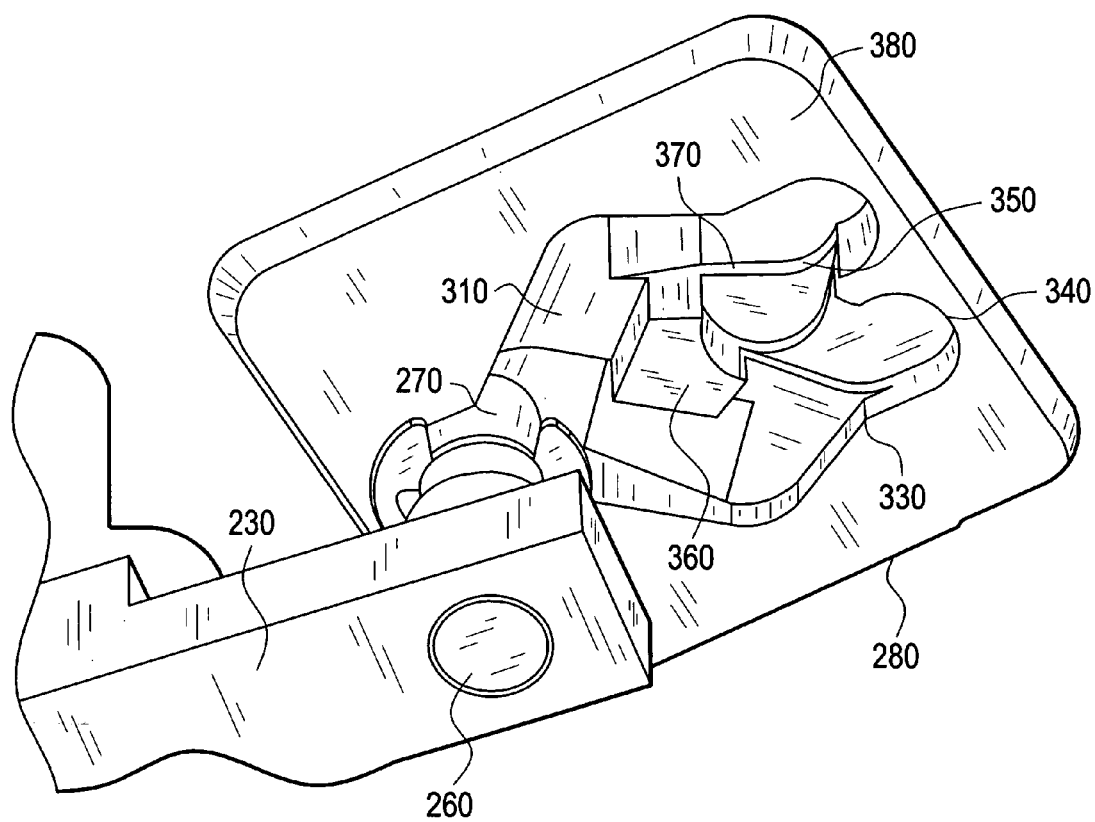
FIG. 4 illustrates a ratcheting mechanism in accordance with a preferred embodiment of the present invention.

As the plunger pin 270 moves, it is guided by a ratcheting mechanism 280 attached to the side of the pedal housing 110. In a preferred embodiment of the present invention, a spring 290 is placed around the plunger pin 270, and is positioned between the back link 230 and a washer 300. The spring 290 keeps the plunger pin 270 in constant contact with the ratcheting mechanism 280. As is seen in FIG. 4, the ratcheting mechanism 280 includes a diamond-shaped groove 310. The groove 310 is surrounded by walls 330 that confine the plunger pin 270 to the path of the groove 310. FIG. 4 illustrates the plunger pin 270 when the braking apparatus 100 is in the unlocked position. As the pedal 160 is depressed, the plunger pin 270 begins to move laterally to the right (counterclockwise around the groove), always remaining in the path of the groove 310. As the plunger pin 270 moves to the right, the surface of the groove 310 rises, causing the spring 290 to contract and causing the plunger pin 270 to move upward through the opening 260 in the back link 230. The plunger pin 270 continues to rise until it hits the first step 330, at which point the base of the groove 310 abruptly falls. As the plunger pin 270 travels over step 330, the tension in spring 290 causes the plunger pin 270 to move downward along with the base of the groove 310. This sudden downward movement causes an audible "click" when the plunger pin 270 resumes contact with the groove 310, which notifies the user of the plunger pin's position.

After travelling over step 330, the plunger pin 270 enters a recessed guideway and comes into contact with side wall 340, causing the plunger pin 270 to stop. It is at this point that the pedal 160 can no longer be depressed. The user removes his or her foot from the pedal 160, causing the pedal 160, and thus the plunger pin 270, to try to return to their original position. However, in attempting to retreat, the plunger pin 270 contacts step 330. Since the spring 290 forces the plunger pin 270 to remain in contact with the surface of the groove 310, the plunger pin 270 cannot climb up step 330, and thus, cannot return to its original position. Instead, plunger pin 270 is steered down step 350 and into stopper 360, which securely holds the plunger pin 270 in place. As the plunger pin 270 travels down step 350, the user hears a second "click", notifying him or her that the pedal 160 is in the locked position.

To unlock the pedal 160, the user simply depresses the pedal 160 slightly, causing the plunger pin 270 to move to the right and down step 370. Again a "click" will notify the user that the lock has been disengaged. Once the plunger pin 270 enters the recessed guideway and contacts side wall 380, the user cannot move the pedal 160 any further. The user removes the pressure, which causes the plunger pin 270 to move back to the left until the plunger pin 270 returns to its original position, as shown in FIG. 4. Likewise, the pedal 160 will return upwards to its original position.

Figure 5:
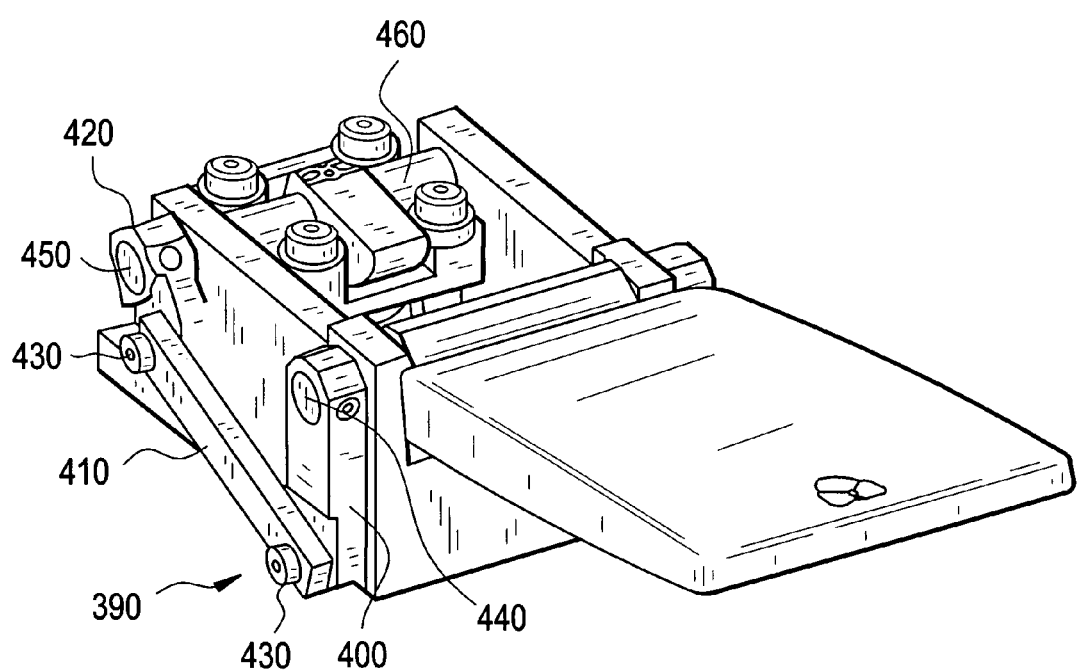
FIG. 5 illustrates a rear view of a preferred embodiment of the present invention.
Figure 3:
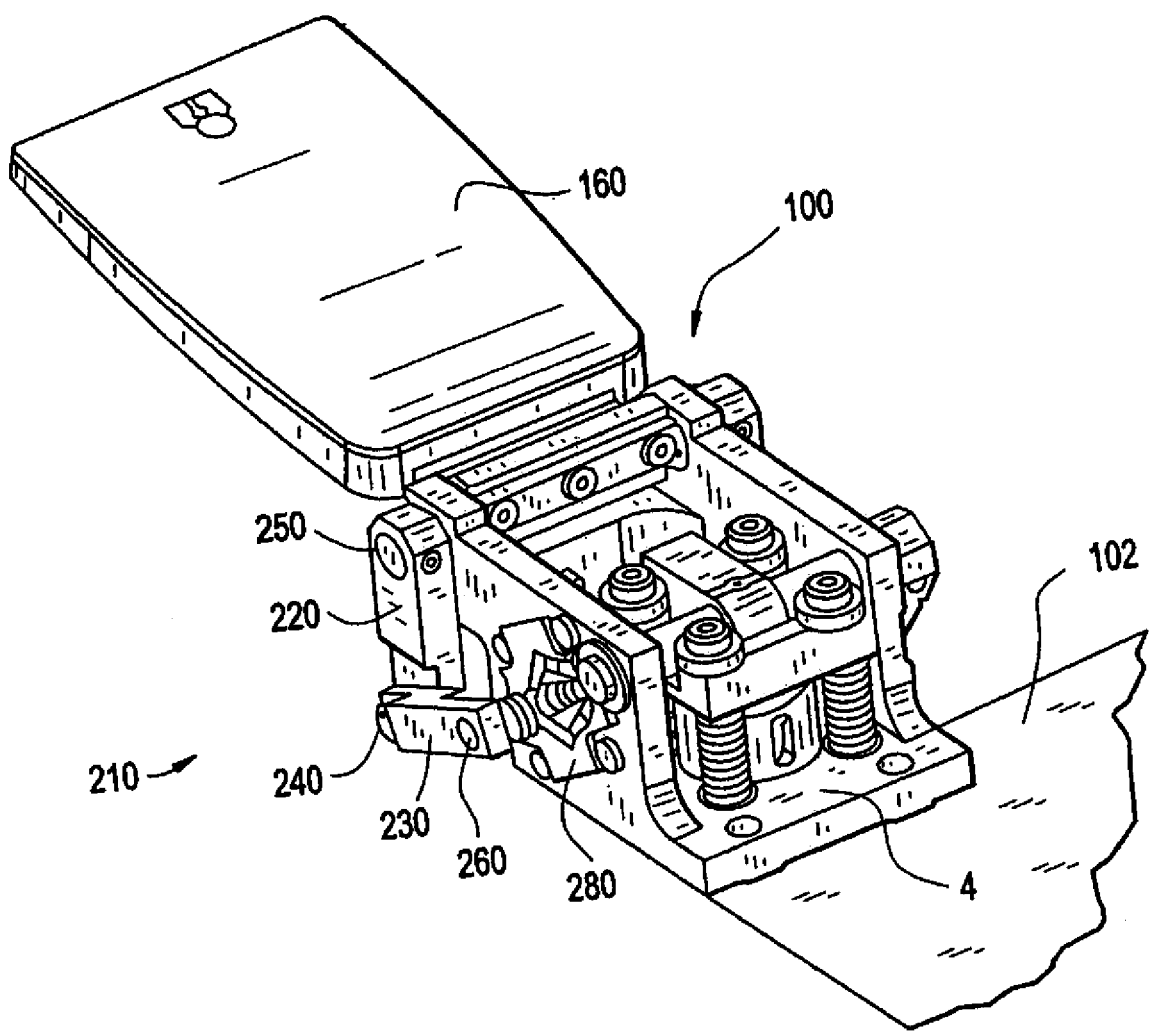

As is seen in FIG. 5, the second set of linkage members 390 coordinates the movement of the plunger assembly 130 into either the locked or unlocked position. The second set of linkage members 390 includes three links—the front link 400, middle link 410, and back link 420—connected by pins 430. The front link 400 includes a recess 440 for receiving shaft 170, while back link 420 includes an opening 450 for holding and camshaft 460. As the pedal 160 is depressed and the shaft 170 is rotated, the rotation of shaft 170 is transmitted to back link 420 through front link 400 and middle link 410, which in turns causes camshaft 460 to rotate.

FIG. 2 illustrates the plunger assembly 130. In a preferred embodiment, the plunger assembly 130 includes a hollow piston 140 having a brake pad 150 on one end. A plunger spring 470 is placed in the center of the piston 140 and is held in place by a pin 480, inserted through a slotted opening 490 in the piston 140. Plunger spring 470 allows for compliance with the floor, thereby allowing the braking apparatus 100 to be used on uneven floors or floors of varying height. A cam follower 500, having a downward boss 510, covers the hollow center of the piston 140. The boss 510 fits inside the center of the piston 140 and rests on top of the pin 480. Fasteners 520 connect the cam follower 500, and thus the plunger assembly 130, to the pedal housing 110. The fasteners 520 are threaded through pad springs 530. These fasteners 520 also align the plunger assembly 130 precisely with the housing recess 120.

Returning to FIG. 1, in a preferred embodiment the housings 540 for receiving the fasteners 520 define a recess 550 for receiving a cam 560, which is seated on the camshaft 460. Pushing the pedal 160 into the locked position causes the camshaft 460 to rotate, which in turn drives the cam 560. The cam 560 forces the cam follower 500 downward, pushing the plunger spring 470, and therefore the piston 140, downward until the plunger assembly 130 is in contact with the floor. When the pedal 160 is pushed to disengage the lock, the cam 460 retreats, causing the pad springs 530 to release and allow the cam follower 500 to return to its original position. Likewise, plunger spring 470 causes the plunger assembly 130 to retract to its original position within the pedal housing 110.

It is apparent from the previous description that the preferred embodiment of the present invention provides a novel system that satisfies the objectives and advantages set forth above. While particular elements, embodiments and applications of the present invention have been shown and described, it is understood that the invention is not limited thereto since modifications may be made by those skilled in the art, particularly in light of the foregoing teaching. It is therefore contemplated by the appended claims to cover

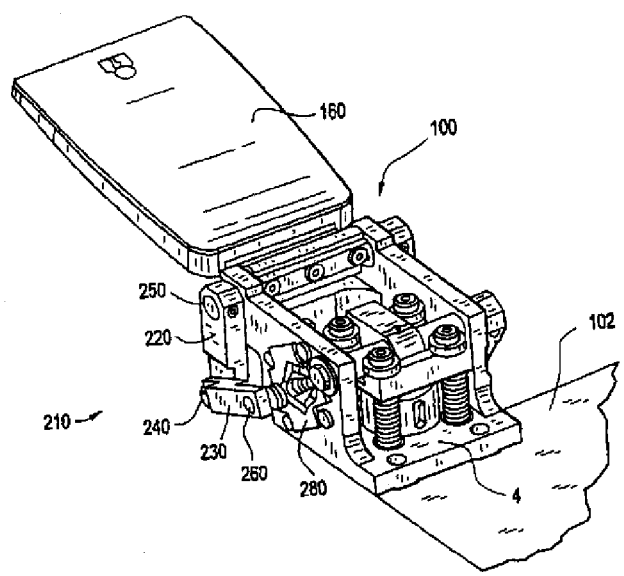

What is claimed is:

1. A braking apparatus for securely positioning a mobile medical device comprising a locking mechanism for locking said mobile medical device in a desired position, a pedal connected to said locking mechanism for moving said locking mechanism between locked and unlocked positions, said locking mechanism being engaged when said pedal is in said locked position, and said locking mechanism being disengaged when said pedal is in said unlocked position, and a steering mechanism with a linkage member attached to said pedal, said steering mechanism defining a path along which said linkage member travels as said pedal is moved between said locked and unlocked positions, wherein said steering mechanism comprises a set of linking members connected to a spring-loaded plunger pin, said plunger pin being guided through a ratcheting mechanism when pressure is applied to said pedal.

2. The braking apparatus of claim 1 wherein said locking mechanism is a plunger assembly having a slotted piston for receiving a pin for engaging a spring located within the periphery of said plunger assembly.

3. The braking apparatus of claim 1 wherein said steering mechanism produces an audible noise to notify the user of the position of said plunger pin.

4. A mobile medical apparatus comprising:
  a mobile medical device;
  a braking apparatus for securing said mobile medical device in a desired position;
  a pedal for engaging or disengaging said braking apparatus;
  a pedal housing connected to said medical device, said pedal housing having a shaft for connecting said pedal to said pedal housing, said shaft being connected to first and second linkage members, said first linkage members steering said pedal such that said pedal comes to rest in either a locked or unlocked position, and second linkage members for engaging or disengaging a locking mechanism in coordination with said pedal being in one of said locked and unlocked position, wherein said first linkage members having a plunger pin, said plunger pin being guided through a ratcheting mechanism.

5. The braking apparatus of claim 4 wherein said plunger pin makes an audible noise to notify the user of the position of said plunger pin.

6. The braking apparatus of claim 4 wherein said locking mechanism includes a plunger assembly.

7. The braking apparatus of claim 6 wherein said plunger assembly has a slotted piston for receiving a pin for engaging a spring located within the periphery of said plunger assembly.

8. A braking apparatus for securely positioning a mobile medical device comprising a locking mechanism for locking said mobile medical device in a desired position, a pedal connected to said locking mechanism for moving said locking mechanism between locked and unlocked positions, said locking mechanism being engaged when said pedal is in said locked position, and said locking mechanism being disengaged when said pedal is in said unlocked position, and a steering mechanism with a linkage member attached to said pedal, said steering mechanism defining a path along which said linkage member travels as said pedal is moved between said locked and unlocked positions, wherein said steering mechanism includes a recessed guideway along which said linkage member travels, said guideway defining an intermediate position for said pedal when moving between said locked and unlocked positions.

* * * * *

UNITED STATES PATENT AND TRADEMARK OFFICE
CERTIFICATE OF CORRECTION

| | | |
|---|---|---|
| PATENT NO. | : 7,243,761 B1 | Page 1 of 3 |
| APPLICATION NO. | : 09/690272 | |
| DATED | : July 17, 2007 | |
| INVENTOR(S) | : Jeffrey W. Pattee et al. | |

It is certified that error appears in the above-identified patent and that said Letters Patent is hereby corrected as shown below:

The title page showing the illustrative figure, should be deleted and substitute therefor the attached title page.

The sheet of drawing consisting of figure 3 should be deleted and substitute therefor the attached sheet.

Col. 3, line 25, after the sentence "As seen in FIG. 3, the first set of linking members 210 steers the pedal 160 into either the locked or unlocked positions." please insert -- The braking apparatus 100 is shown mounted to a medical device 102. --

Signed and Sealed this

Ninth Day of June, 2009

JOHN DOLL
*Acting Director of the United States Patent and Trademark Office*

(12) United States Patent
Pattee et al.

(10) Patent No.: US 7,243,761 B1
(45) Date of Patent: Jul. 17, 2007

(54) RACHET LOCKING BRAKE FOR MEDICAL DEVICES

(75) Inventors: Jeffrey W. Pattee, Salt Lake City, UT (US); John M. Simmons, West Jordan, UT (US); David M. Robbins, Sandy, UT (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 1471 days.

(21) Appl. No.: 09/690,272

(22) Filed: Oct. 17, 2000

(51) Int. Cl.
*B60T 1/14* (2006.01)
(52) U.S. Cl. ................... 188/7; 188/5; 188/32
(58) Field of Classification Search .............. 188/5, 188/7, 2 F, 32, 23, 19, 20; 5/600; 296/20
See application file for complete search history.

(56) References Cited

U.S. PATENT DOCUMENTS

| | | | | |
|---|---|---|---|---|
| 2,236,281 A | * | 3/1941 | Anderson | 188/5 |
| 2,747,692 A | * | 5/1956 | Holmes | 188/5 |
| 2,922,494 A | * | 1/1960 | Clark, Jr. | 188/5 |
| 3,422,929 A | * | 1/1969 | Oja et al. | 188/5 |
| 5,806,111 A | * | 9/1998 | Heimbrock et al. | 5/600 |

FOREIGN PATENT DOCUMENTS

| | | |
|---|---|---|
| JP | 49-009888 A | 1/1974 |
| JP | 63-150070 A | 6/1988 |
| JP | 01-167212 U | 11/1989 |
| JP | 04-331602 A | 11/1992 |
| JP | 05-065315 U | 8/1993 |
| JP | 06-005619 U | 1/1994 |
| JP | 06-048102 A | 2/1994 |
| JP | 09-140692 A | 6/1997 |

OTHER PUBLICATIONS

PCT International Search Report PCT/US03/36255 (Aug. 4, 2004).

* cited by examiner

*Primary Examiner*—Thomas Williams
(74) *Attorney, Agent, or Firm*—McAndrews, Held & Malloy, Ltd.; Peter J. Vogel; Michael A. Dellapenna

(57) ABSTRACT

An apparatus is provided for securely positioning a medical device that prevents movement of one end of the device by applying a single force. The apparatus allows a doctor to depress a pedal, which is connected to a pedal housing by way of a single shaft. Connected to the ends of the shaft are two separate linkage members. The first linkage member is attached to a ratcheting mechanism that steers the pedal into the locked position. The second linkage member is connected to a cam within the pedal housing that drives a spring-loaded plunger assembly. When the pedal is in the locked position the plunger assembly is in contact with the floor, thereby preventing movement of the device. To release the braking device, the doctor depresses the pedal slightly, which causes the ratcheting mechanism to allow the pedal, and therefore the plunger assembly, to return to their unlocked positions.

8 Claims, 5 Drawing Sheets